(12) United States Patent
Lototskiy

(10) Patent No.: US 10,581,819 B1
(45) Date of Patent: Mar. 3, 2020

(54) NETWORK TRAFFIC SCANNING OF ENCRYPTED DATA

(71) Applicant: Symantec Corporation, Mountain View, CA (US)

(72) Inventor: Alexander L. Lototskiy, Sunnyvale, CA (US)

(73) Assignee: CA, Inc., San Jose, CA (US)

( * ) Notice: Subject to any disclaimer, the term of this patent is extended or adjusted under 35 U.S.C. 154(b) by 143 days.

(21) Appl. No.: 14/973,337

(22) Filed: Dec. 17, 2015

(51) Int. Cl.
 *H04L 29/06* (2006.01)
 *H04L 29/08* (2006.01)

(52) U.S. Cl.
 CPC ............ *H04L 63/062* (2013.01); *H04L 67/02* (2013.01); *H04L 67/141* (2013.01)

(58) Field of Classification Search
 CPC ............... H04L 63/0281; H04L 63/168; H04L 63/0464; H04L 63/062; H04L 67/141; H04L 67/02
 See application file for complete search history.

(56) References Cited

U.S. PATENT DOCUMENTS

| | | | | |
|---|---|---|---|---|
| 7,187,666 B1* | 3/2007 | Farley | ................... | H04W 36/02 370/331 |
| 8,312,552 B1* | 11/2012 | Hadden | ................... | G06F 21/10 713/176 |
| 8,707,437 B1* | 4/2014 | Ming-Chang | ......... | G06F 21/554 726/22 |
| 8,806,020 B1* | 8/2014 | Lewis | ............... | H04W 36/0066 709/227 |
| 9,642,008 B2* | 5/2017 | Wyatt | ................... | H04W 12/08 |
| 10,452,862 B2* | 10/2019 | Wyatt | ................... | H04W 12/02 |
| 2003/0065941 A1* | 4/2003 | Ballard | ................... | H04L 63/04 726/1 |
| 2003/0084322 A1* | 5/2003 | Schertz | ................... | G06F 21/55 726/23 |
| 2003/0131259 A1* | 7/2003 | Barton | ................ | H04L 63/0281 726/12 |
| 2003/0135749 A1* | 7/2003 | Gales | .................... | G06F 21/577 726/25 |
| 2004/0255126 A1* | 12/2004 | Reith | .................... | H04L 63/083 713/183 |
| 2005/0188080 A1* | 8/2005 | Motsinger | ........... | H04L 63/1408 709/224 |
| 2005/0188081 A1* | 8/2005 | Gibson | ................... | H04L 43/08 709/224 |
| 2006/0168074 A1* | 7/2006 | Gardner | ................. | H04L 51/12 709/206 |

(Continued)

*Primary Examiner* — John B King
(74) *Attorney, Agent, or Firm* — FisherBroyles, LLP (57) ABSTRACT

Techniques are disclosed herein for scanning encrypted data sent to and from applications executing in user space of a computer system. A traffic monitoring tool of a network intrusion prevention system detects a secure session being established between an application executing on a client and a server. The traffic monitoring tool retrieves, from the client application, a symmetric key generated by the client application. The traffic monitoring tool intercepts encrypted data transmitted between the client application and the server as part of the secure session. The traffic monitoring tool decrypts the encrypted data using the retrieved symmetric key. Upon determining that the decrypted data indicates a threat to the client, transmission of the encrypted data is blocked.

17 Claims, 5 Drawing Sheets

(56) References Cited

U.S. PATENT DOCUMENTS

| | | | |
|---|---|---|---|
| 2007/0244987 A1* | 10/2007 | Pedersen | H04L 67/06 709/217 |
| 2008/0034417 A1* | 2/2008 | He | H04L 67/02 726/15 |
| 2008/0056487 A1* | 3/2008 | Akyol | H04L 63/0428 380/2 |
| 2008/0222299 A1* | 9/2008 | Boodaei | H04L 63/1466 709/229 |
| 2008/0222736 A1* | 9/2008 | Boodaei | G06F 21/128 726/27 |
| 2009/0307142 A1* | 12/2009 | Mardikar | G06Q 20/1085 705/72 |
| 2013/0191631 A1* | 7/2013 | Ylonen | H04L 63/1483 713/153 |
| 2013/0198512 A1* | 8/2013 | Rubin | H04L 63/0823 713/157 |
| 2015/0039889 A1* | 2/2015 | Andoni | H04L 9/0825 713/170 |
| 2015/0118992 A1* | 4/2015 | Wyatt | H04W 12/08 455/410 |
| 2017/0155675 A1* | 6/2017 | Howe | H04L 63/0428 |
| 2017/0171164 A1* | 6/2017 | Alexander | H04L 63/0823 |

\* cited by examiner

NETWORK TRAFFIC SCANNING OF ENCRYPTED DATA

BACKGROUND

Field

Embodiments presented herein generally relate to network intrusion prevention, and more specifically, to scanning encrypted data sent to and from applications (e.g., web browsers, e-mail clients) executing in user space of a computing system.

Description of the Related Art

Generally, network intrusion prevention refers to a variety of techniques for monitoring activity in a network and identifying potential threats (e.g., vulnerabilities and risks) that can cause damage to various computer systems and devices in the network. Some client systems, e.g., in an enterprise network, may include an intrusion prevention application that scans data transferred between a client application and server to identify malware, viruses, and other types of attacks and vulnerabilities. For example, the intrusion prevention application can monitor traffic sent to and from a client web browser and detect malware being sent from a web server. Once detected, the intrusion prevention application blocks or quarantines such data from affecting the client system.

Currently, many client applications use secure protocols, such as HTTPS, to establish a secure channel with a server. In such a case, the client and server encrypt data prior to transferring the data to one another. Doing so ensures that a third party is unable to read the data, even if the third party somehow obtains it. However, one consequence is that a network intrusion prevention system is also unable to read the encrypted data. As a result, if the underlying data poses some vulnerability or risk to a client system, the network prevention system would be unable to identify the potential vulnerability and therefore block the data from being transferred to the client system.

SUMMARY

One embodiment presented herein discloses a method. This method generally includes retrieving, from an application executing on a client, a symmetric key generated by the client application upon detecting a secure session being established between a server and the client application. The method also generally includes intercepting encrypted data transmitted between the client application and the server as part of the secure session. The encrypted data is decrypted using the retrieved symmetric key. Upon determining that the decrypted data indicates a potential threat to the client, transmission of the encrypted data is blocked.

Another embodiment presented herein discloses a non-transitory computer-readable storage medium having instructions, which, when executed on a processor, perform an operation. This operation generally includes retrieving, from an application executing on a client, a symmetric key generated by the client application upon detecting a secure session being established between a server and the client application. The operation also generally includes intercepting encrypted data transmitted between the client application and the server as part of the secure session. The encrypted data is decrypted using the retrieved symmetric key. Upon determining that the decrypted data indicates a potential threat to the client, transmission of the encrypted data is blocked.

Yet another embodiment presented herein discloses a system having a processor and a memory. The memory stores code, which, when executed on the processor, performs an operation. This operation generally includes retrieving, from an application executing on a client, a symmetric key generated by the client application upon detecting a secure session being established between a server and the client application. The operation also generally includes intercepting encrypted data transmitted between the client application and the server as part of the secure session. The encrypted data is decrypted using the retrieved symmetric key. Upon determining that the decrypted data indicates a potential threat to the client, transmission of the encrypted data is blocked.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments presented herein describe techniques for scanning encrypted network data sent to and from user space applications executing in a client system. In particular, an intrusion prevention application includes a traffic monitoring tool. In one embodiment, a kernel driver in the traffic monitoring tool is configured with an Application Programming Interface (API) hook to a given application used to initiate a secure session with a server. For example, the traffic monitoring tool may access, via the API hook, a web browser application library used to establish a secure session with a web server.

The API hook allows the traffic monitoring tool to detect instances where the web browser establishes a secure session with a server. For example, the traffic monitoring tool may detect an instance where the web browser initiates an HTTPS session with a given web server. As known, during an HTTPS session, both the client and server generate a symmetric key used to encrypt and decrypt data transferred between one another.

In one embodiment, the traffic monitoring tool detects such instances, and uses the hook to obtain the symmetric key from the web browser and an identifier associated with the secure session. The hook sends the symmetric key and the session ID to a kernel driver of the intrusion prevention application. As a result, the traffic monitoring tool may use the symmetric key to decrypt data sent to and from the web browser.

To do so, the traffic monitoring tool intercepts encrypted data sent to (or from) the web browser. The traffic monitoring tool determines the ID associated with the session and retrieves an appropriate symmetric key from the kernel driver. The traffic monitoring tool may then decrypt the data using the symmetric key. Doing so allows the intrusion prevention application to scan the now-decrypted data for potential vulnerabilities, and as a result may perform preventative actions in the event that the data poses a risk to the client system.

Advantageously, embodiments presented herein provide an approach for scanning secure network traffic transferred between a client application and a server. Hooking an application library configured to manage secure sessions between client and server allows the intrusion prevention application to obtain a symmetric key used to secure data during such sessions. As a result, the intrusion prevention application can decrypt the encrypted data with relatively small computational expense to the client application.

Note, the following uses a web browser as an example of a user space application that sends encrypted data to and from a server via a session established using a secure protocol (e.g., HTTPS). However, one of skill in the art will recognize that embodiments may be adapted to various applications that establish a secure session with a server to transfer encrypted data. For example, embodiments may be adapted to an e-mail client that encrypts data during transfer in a HTTPS session.

Figure 1:
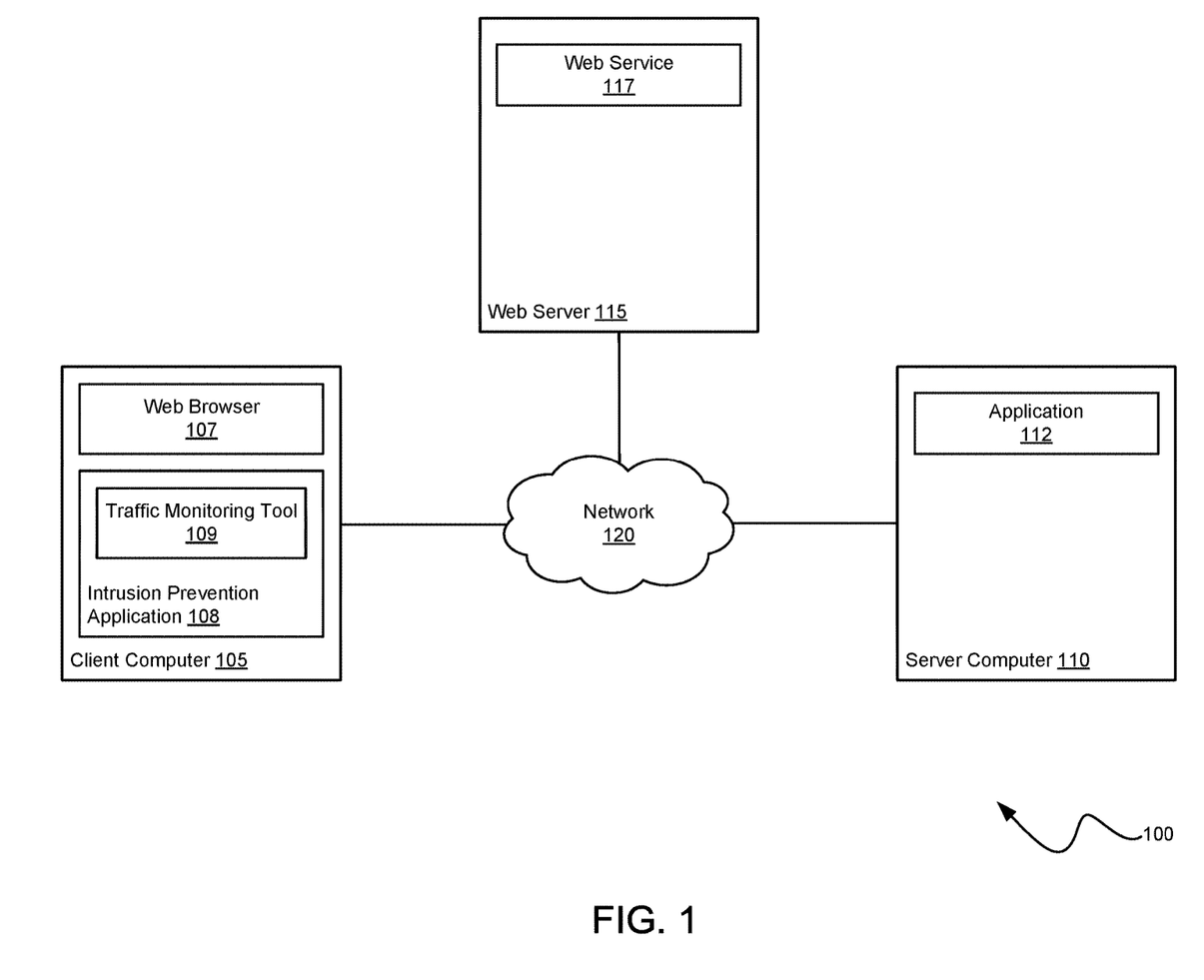
FIG. 1 illustrates an example computing environment, according to one embodiment.

FIG. 1 illustrates an example computing environment 100, according to one embodiment. As shown, the computing environment 100 includes a client computer 105, a server computer 110, and a web server 115, each interconnected via a network 120 (e.g., the Internet). In one embodiment, the client computer 105 may represent a physical computer (e.g., a laptop, desktop, mobile device, etc.) or a virtual computing instance executing in the cloud. Further, the client computer 105 may be a computer in an enterprise network.

In one embodiment, the client computer 105 includes a web browser 107 and an intrusion prevention application 108. The web browser 107 accesses services over the network 120, such as an application 112 hosted by the server computer 110 and presented via a web service 117 hosted by the web server 115. Further, the intrusion prevention application 108 monitors data traffic flowing to and from the client computer 105, such as communication between the web browser 107 and web service 117.

The intrusion prevention application 108 scans the data and identifies malicious activity, such as the presence of malware and viruses. For instance, the intrusion prevention application 108 may evaluate the data for known attack signatures and patterns. Once identified, the intrusion prevention application 108 may block such data from being transferred to the web browser 107. The intrusion prevention application 108 may also alert a user of any identified attacks, risks, and other threats to the client computer 105.

In some cases, the web browser 107 and the web service 117 may establish a secure session with one another prior to transferring any data. For example, the web browser 107 and web service 117 may use the HTTPS protocol to ensure that the data exchanged between one another remains private. As known, HTTPS uses an underlying protocol (e.g., Transport Layer Security (TLS), Secure Sockets Layer (SSL)) to establish the secure connection as well as a symmetric key (e.g., generated based in part on digital certificates distinctly identifying the client and server) used to encrypt data being transferred. However, as a result, the intrusion prevention application 108 is unable to read the encrypted data as-is.

In one embodiment, the intrusion prevention application 108 includes a traffic monitoring tool 109 configured to decrypt data exchanged over a secure connection between user space applications in the client computer 105 (e.g., the web browser 107) and a server. To do so, the traffic monitoring tool 109 installs a hook into an application library associated with a given application, e.g., the web browser 107.

More specifically, the traffic monitoring tool 109 hooks into an application library that manages secure sessions and encrypts/decrypts data over the sessions. As a result, the traffic monitoring tool 109 detects instances where the web browser 107 initiates a secure session with the web service 117. Further, the traffic monitoring tool 109 obtains, via the hook, a generated symmetric key and ID associated with the secure session. Thereafter, the traffic monitoring tool may use the symmetric key and session ID to decrypt data exchanged between the web browser 107 and the web server 117.

Figure 2:
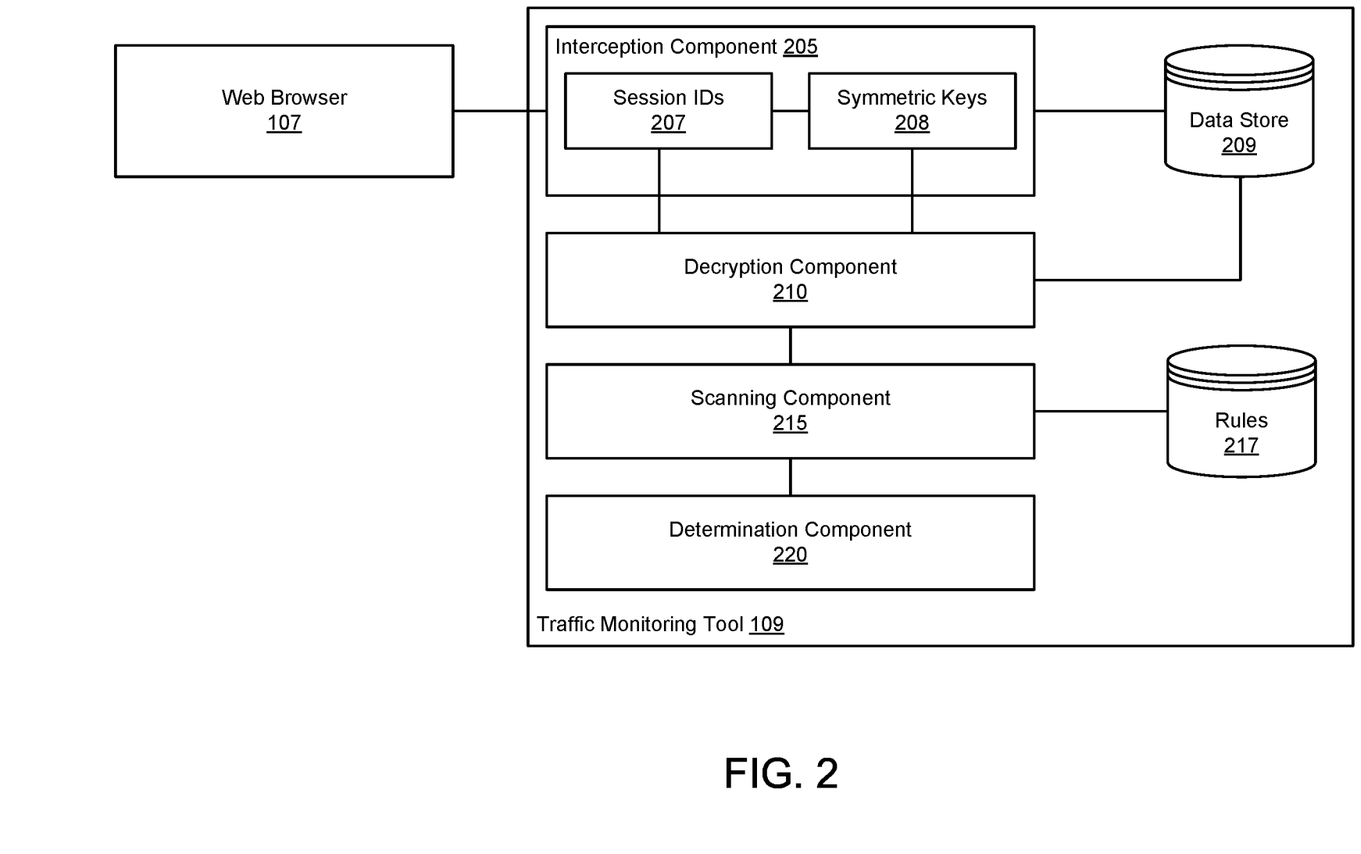
FIG. 2 further illustrates the traffic monitoring tool described relative to FIG. 1, according to one embodiment.

FIG. 2 further illustrates the traffic monitoring tool 109, according to one embodiment. As shown, the traffic monitoring tool 109 includes an interception component 205, data store 209, decryption component 210, scanning component 215, rules 217, and determination component 220.

In one embodiment, the interception component 205 is a kernel-level module that communicates with the web browser 107 via an application programming interface (API) hook to application libraries of the web browser 107. The interception component 205 detects instances where the web browser 107 initiates a secure session with a remote server, e.g., using an HTTPS protocol.

When the web browser 107 establishes the secure session, the interception component 205 may retrieve, via the hook, a symmetric key that the web browser 107 uses to encrypt/decrypt data. Further, the interception component 205 obtains an identifier associated with the session. The interception component 205 may retain the session ID (207) and symmetric key (208). Doing so allows the traffic monitoring tool to determine which session that a given symmetric key is associated with.

Further, the interception component 205 may, as another approach, obtain a security context data BLOB (binary large object) of data from the web browser 107 that includes the symmetric key. The interception component 205 may then call a cryptographic library API that exports the symmetric key. Yet another approach can involve the interception component 205 generating setting a hook on a cryptographic library and generating a corresponding event notification indicating that a given cryptographic library API has imported a new security context data BLOB including a symmetric key from another layer of cryptographic provider, authentication provider, or security protocol provider (e.g., of TLS, SSL, etc.). The interception component 205 may then use another API provided by the cryptographic library to query information regarding the symmetric key.

In one embodiment, the interception component 205 detects instances where the web browser 107 and a remote server transfer encrypted data between one another within a secure session. The interception component 205 obtains encrypted data from the web browser 107 (e.g., prior to the web browser 107 decrypting the data using the symmetric key) and stores a copy of the encrypted data in a data store 209. The interception component 205 may also store session information associated with the encrypted data.

In one embodiment, the decryption component 210 retrieves stored encrypted data from the data store 209. Further, the decryption component 210 retrieves a symmetric key associated with the session from which the encrypted data originates. To identify the symmetric key, the decryption component 210 may determine a matching session ID associated with the symmetric key and the encrypted data. The decryption component 210 uses the identified symmetric key to decrypt the encrypted data. Doing so allows the traffic monitoring tool 109 to evaluate the data as if the data were originally unencrypted.

For example, the traffic monitoring tool 109 includes a scanning component 215 that evaluates data based on a set of rules 217. The scanning component 215 temporarily stores the decrypted data in a buffer (e.g., the data store 209) for the evaluation. The rules 217 may include virus definitions, known attack signatures, and the like that allow the scanning component 215 to detect threats, vulnerabilities, and risks that may be part of the data. The scanning component 215 may send the evaluation to the determination component 220, which in turn, may perform some action in the event that the scanning component 215 identifies some risk or vulnerability in the unencrypted data. For instance, the determination component 220 may prevent the web browser 107 from unencrypting and reading the data. As another example, the determination component 220 may block the web browser 107 from transmitting data identified to be sensitive based on the rules 217.

Figure 3:
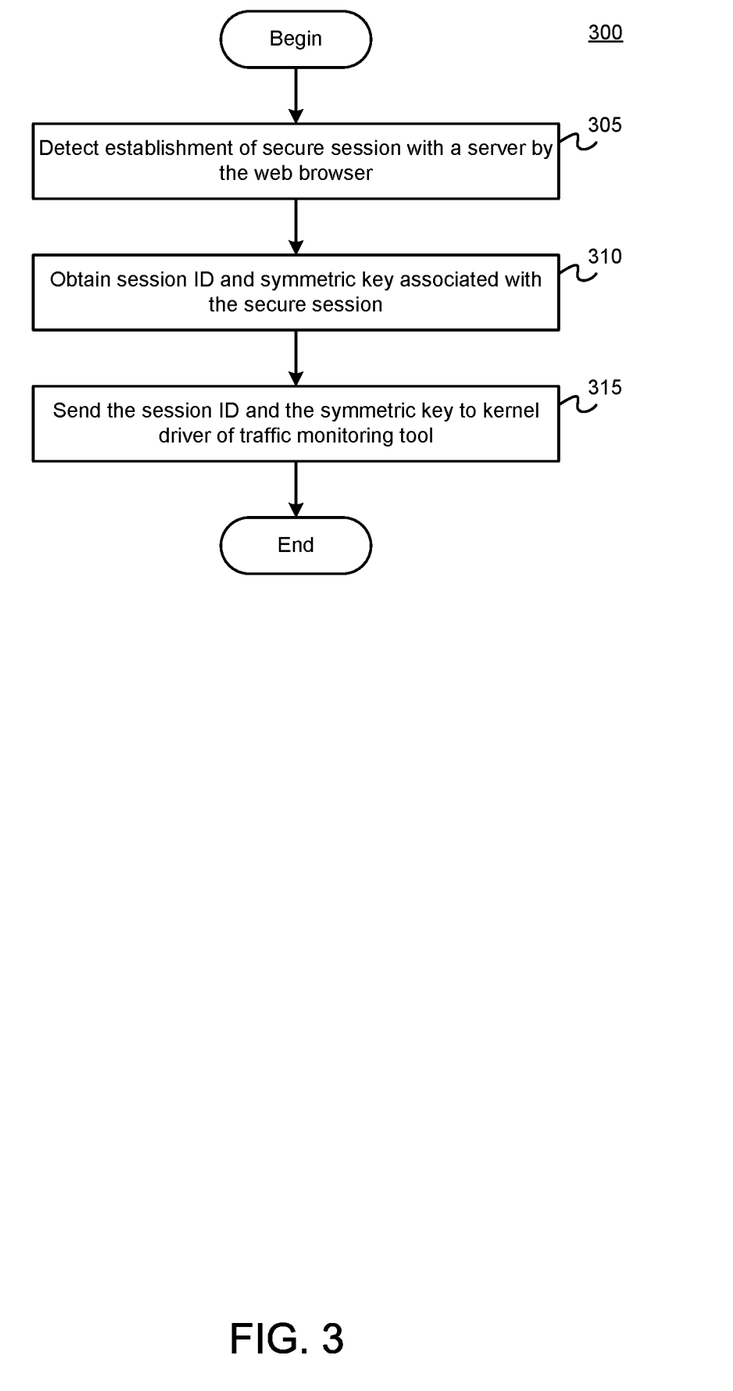
FIG. 3 illustrates a method for obtaining a symmetric key for encrypting and decrypting data in a secure session between a client application and a server, according to one embodiment.

FIG. 3 illustrates a method 300 for obtaining a symmetric key for encrypting and decrypting data in a secure session between a client application and a server, according to one embodiment. In this example method, assume that the traffic monitoring tool 109 is configured with an API hook to the web browser 107. Of course, the client application may be a variety of applications. As shown, method 300 starts at step 305, where the interception component 205 detects the web browser 107 establishing a secure connection (e.g., TLS, SSL, etc.) with a remote server, e.g., a web server providing access to a server application.

At step 310, the interception component 205 obtains a symmetric key and a session ID associated with the established secure session between the web browser 107 and the server. Doing so allows the traffic monitoring tool 109 to decrypt communications (i.e., data encrypted using the symmetric key) exchanged between the web browser 107 and the server, as further explained relative to FIG. 4.

At step 315, the interception component 205 sends the symmetric key and the session ID to the kernel driver of the traffic monitoring tool 109. The kernel driver associates the session ID with the symmetric key, which allows the traffic monitoring tool 109 to map a symmetric key to a given secure session, as the web browser 107 may communicate securely with multiple servers in individual sessions at a time.

Figure 4:
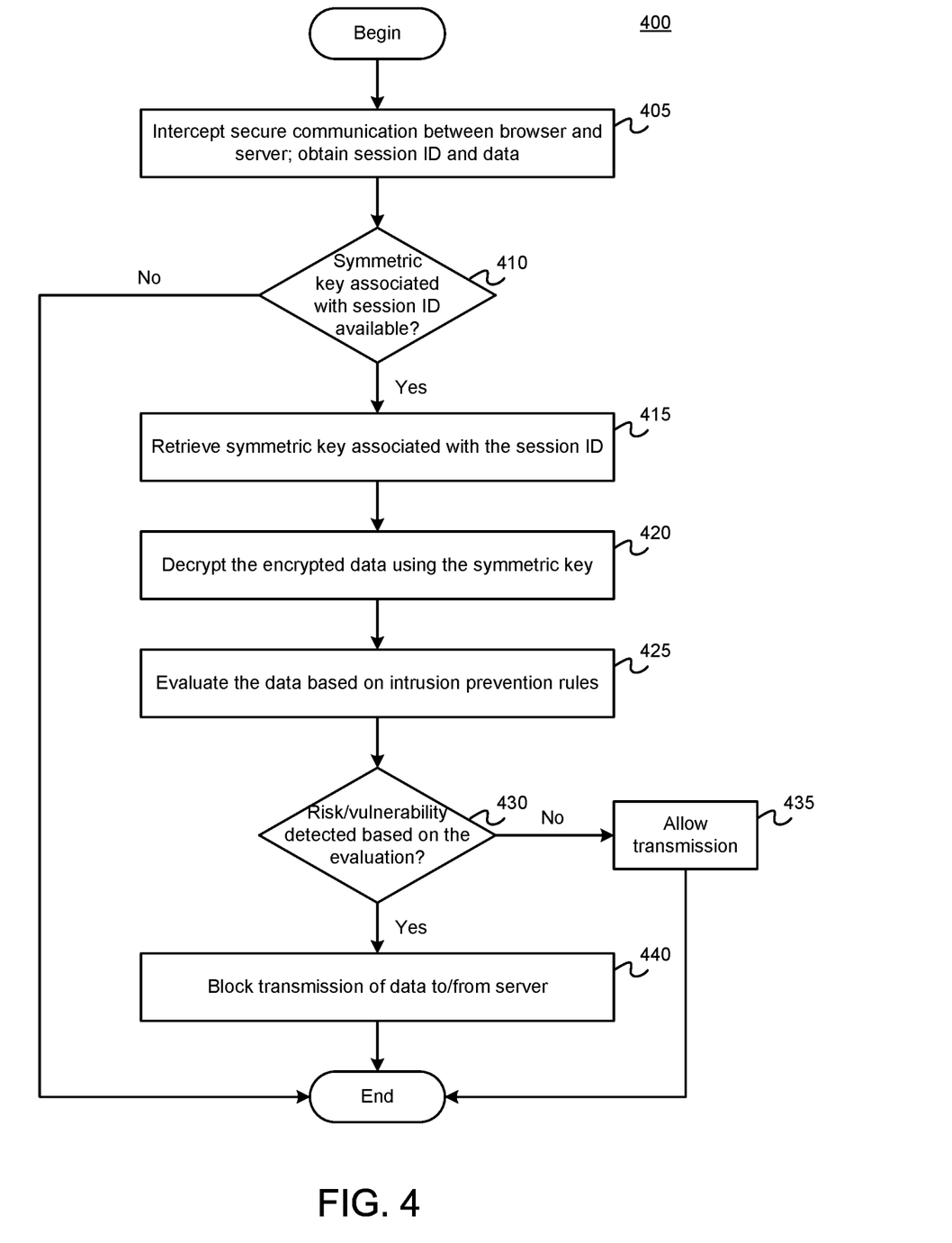
FIG. 4 illustrates a method for scanning encrypted data transferred between a client application and a server, according to one embodiment.

FIG. 4 illustrates a method 400 for scanning encrypted data transferred between a client application and a server, according to one embodiment. For ease of illustration, assume that method 400 continues the example described relative to FIG. 3—the web browser 107 and the server have established an HTTPS session with one another, and the traffic monitoring tool has obtained a symmetric key associated with that session.

As shown, method 400 begins at step 405, where the interception component 205 retrieves encrypted data transmitted during the HTTPS session between the web browser 107 and the server. The interception component 205 may suspend transmission of further data between the web browser 107 and the server as the traffic monitoring tool 109 evaluates the current encrypted data. The interception component 205 creates a copy of the encrypted data and stores the copy in a local data store.

The interception component 205 also identifies the session ID associated with the encrypted data. At step 410, the decryption component 210 determines whether a symmetric key associated with the identified session ID is available. To do so, the decryption component 210 may determine whether a session ID maintained in the kernel driver of the traffic monitoring tool 109 matches with the identified session ID. If not, then the kernel driver does not have an associated symmetric key available. In such a case, the interception component 205 may retrieve the symmetric key from the web browser 205, e.g., using the steps discussed relative to FIG. 3.

Otherwise, if the decryption component 210 identifies a matching session ID in the kernel driver, then the decryption component 210 retrieves the associated symmetric key (at step 415). At step 420, the decryption component 210 decrypts the encrypted data with the retrieved symmetric key. Doing so allows the traffic monitoring tool 109 to analyze the now-unencrypted data. At step 425, the scanning component 215 evaluates the data based on one or more network intrusion prevention rules 217. As stated, the rules 217 allow the scanning component 215 to identify potential threats, risks, and vulnerabilities (e.g., malware, attacks, etc.) posed by the unencrypted data. The scanning component 215 sends evaluation results to the determination component 220.

At step 430, the determination component 220 identifies an action to take based on the evaluation results. For example, the determination component 220 may decide whether to allow the transmission of the encrypted data between the web browser 107 and the server or perform some other action with regard to the encrypted data. For instance, if the evaluation results indicate that the encrypted data does not pose any threats, then the determination component 220 may resume transmission of data between the web browser 107 and the server. If the evaluation results indicate that the encrypted data poses some threat, the determination component 220 may block the transmission from occurring (at step 440). Further, the determination component 220 may generate an alert to present to a user of the web browser 107 notifying the user of the detected risk or vulnerability. Thereafter, the user may determine whether to allow the transmission regardless of the detected risk or vulnerability.

Figure 5:
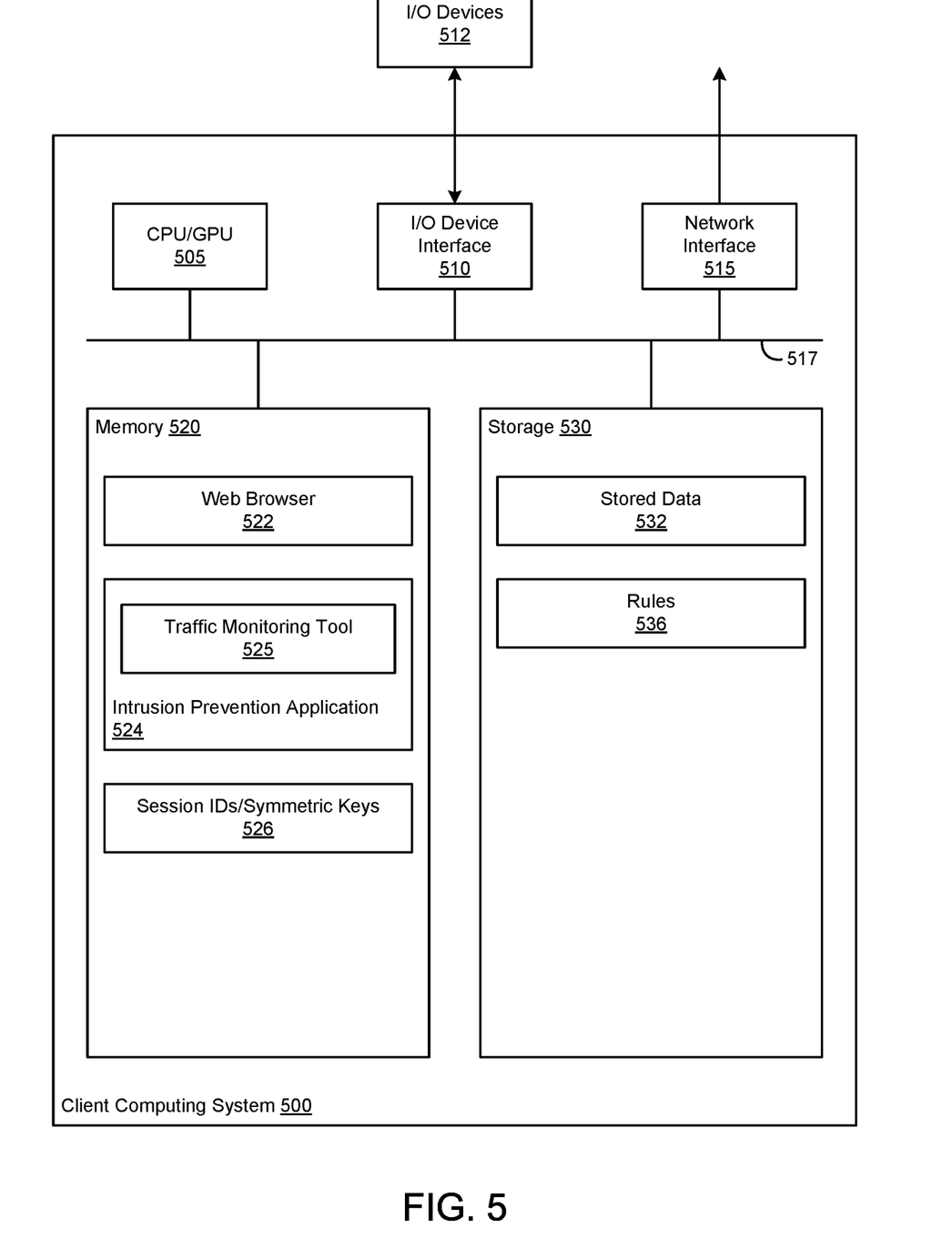
FIG. 5 illustrates an example computing system configured to scan encrypted data transferred between a client application and a server, according to one embodiment.

FIG. 5 illustrates an example client computing system 500 configured to scan encrypted data transferred between a client application and a server, according to one embodiment. As shown, computing system 500 includes, without limitation, a central processing unit (CPU) 505, a network interface 515, a memory 520, and storage 530, each connected to a bus 517. The client computing system 500 may also include an I/O device interface 510 connecting I/O devices 512 (e.g., keyboard, display, mouse devices, etc.) to the client computing system 500. Further, in context of the present disclosure, the computing elements shown in the computing system 500 may correspond to a physical computing system (e.g., a system in an enterprise network).

CPU 505 retrieves and executes programming instructions stored in memory 520 as well as stores and retrieves application data residing in the storage 530. The bus 517 is used to transmit programming instructions and application data between CPU 505, I/O devices interface 510, storage 530, network interface 515, and memory 520. Note, CPU 505 is included to be representative of a single CPU, multiple CPUs, a single CPU having multiple processing cores, and the like. Memory 520 is generally included to be representative of a random access memory. Storage 530 may be a disk drive storage device. Although shown as a single unit, storage 530 may be a combination of fixed and/or removable storage devices, such as fixed disc drives, removable memory cards, or optical storage, network attached storage (NAS), or a storage area-network (SAN).

Illustratively, memory 520 includes a web browser 522, an intrusion prevention application 524, and session IDs/symmetric keys 526. The intrusion prevention application 524 further includes a traffic monitoring tool 525. And storage 530 includes stored data 532 and rules 536. The web browser 522 accesses remote services via a network, such as application services hosted by a remote server. The intrusion prevention application 524, via the traffic monitoring tool 525 monitors data traffic flowing to and from the client computing system 500, such as communications between the web browser 522 and remote servers. Generally, the intrusion prevention application 524 scans the data and identifies malicious activity according to the intrusion prevention rules 536.

In one embodiment, the traffic monitoring tool 525 is configured with an API hook to the web browser 522, which allows the traffic monitoring tool 525 to scan the contents of encrypted data, as the encrypted data is being transmitted between the web browser 522 and a remote server in a secure session (e.g., established via HTTPS). To do so, the traffic monitoring tool 525 can detect, via the hook, when the secure session is established between the web browser 522 and server. When the secure session is established, the web browser 522 and server generate a symmetric key used to encrypt and decrypt data communications with one another.

The traffic monitoring tool 525 obtains, via the hook, a symmetric key and an identifier associated with the secure session (and may maintain in memory as session IDs/symmetric keys 526). Thereafter, when the web browser 522 exchanges encrypted data with a server, the traffic monitoring tool 525 may intercept the data and store a local copy (as stored data 532). The web browser 522 may retrieve the appropriate symmetric key (i.e., associated encrypted data) to decrypt the data. Doing so allows the traffic monitoring tool 525 to scan the data relative to the rules 536 to identify potential risks and vulnerabilities in the underlying data. In turn, the intrusion prevention application 524 may then perform some action in response to any identified potential risks and vulnerabilities. For example, the intrusion prevention application 524 may block the web browser 522 from unencrypting and reading the data.

The preceding discussion presents a variety of embodiments. However, the present disclosure is not limited to the specifically described embodiments. Instead, any combination of the following features and elements, whether related to different embodiments or not, is contemplated to implement and practice the techniques described herein.

Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures.

For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The preceding discussion presents a variety of embodiments. However, the present disclosure is not limited to the specifically described embodiments. Instead, any combination of the following features and elements, whether related to different embodiments or not, is contemplated to implement and practice the techniques described herein. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures.

For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
   accessing, via a traffic-monitoring tool executing at a client, an application library of an application executing at the client, wherein the traffic-monitoring tool includes an application programming interface (API) hook for hooking the traffic-monitoring tool to the application library that establishes a secure session for the client;
   detecting, via the traffic-monitoring tool executing at the client, the secure session being established between a server and the application executing at the client;
   obtaining, via the traffic-monitoring tool executing at the client, a symmetric key generated by the application upon detection of the secure session and a session ID of the secure session to map the symmetric key to the secure session;
   intercepting, via the traffic-monitoring tool executing at the client, encrypted data transmitted between the client application and the server as part of the secure session;
   in response to the interception, suspending, via the traffic-monitoring tool executing at the client, further transmission of further encrypted data between the client application and the server;
   based on the suspension, generating a copy of the encrypted data, via the traffic-monitoring tool executing at the client, wherein the generated copy of the encrypted data is stored at the client;
   decrypting the copy of the encrypted data stored at the client via the traffic-monitoring tool executing at the client using the symmetric key and the session ID;
   determining via the traffic-monitoring tool executing at the client that the decrypted data indicates a potential threat to the client; and
   based on the determination, blocking transmission of the encrypted data to the client application.

2. The method of claim 1, further comprising:
   upon determining that the decrypted data does not include one or more risks to the client, allowing the transmission of the encrypted data.

3. The method of claim 1, wherein the determination is based on one or more rules that include at least one of whether the encrypted data includes malware and whether the encrypted data includes a virus signature.

4. The method of claim 1, wherein the secure session is a HTTPS session.

5. The method of claim 1, wherein the encrypted data is transmitted from the server towards the client application and wherein intercepting the encrypted data comprises obtaining the encrypted data from the server.

6. The method of claim 1, further comprising:
   associating the session ID with the symmetric key.

7. A non-transitory computer-readable storage medium having instructions, which, when executed on a processor, perform an operation comprising:
   accessing, via a traffic-monitoring tool executing at a client, an application library of an application executing at the client, wherein the traffic-monitoring tool includes an application programming interface (API) hook for hooking the traffic-monitoring tool to the application library that establishes a secure session for the client;
   detecting, via the traffic-monitoring tool executing at the client, the secure session being established between a server and the application executing at the client;
   obtaining, via the traffic-monitoring tool executing at the client, a symmetric key generated by the application upon detection of the secure session and a session ID of the secure session to map the symmetric key to the secure session;

intercepting, via the traffic-monitoring tool executing at the client, encrypted data transmitted between the client application and the server as part of the secure session;

in response to the interception, suspending, via the traffic-monitoring tool executing at the client, further transmission of further encrypted data between the client application and the server;

based on the suspension, generating a copy of the encrypted data, via the traffic-monitoring tool executing at the client, wherein the generated copy of the encrypted data is stored at the client;

decrypting the copy of the encrypted data stored at the client via the traffic-monitoring tool executing at the client using the symmetric key and the session ID;

determining via the traffic-monitoring tool executing at the client that the decrypted data indicates a potential threat to the client; and based on the determination, blocking transmission of the encrypted data to the client application.

8. The computer-readable storage medium of claim 7, wherein the operation further comprises:
upon determining that the decrypted data does not include one or more risks to the client, allowing the transmission of the encrypted data.

9. The computer-readable storage medium of claim 7, wherein the determination is based on one or more rules that includes at least one of whether the encrypted data includes malware and whether the encrypted data includes a virus signature.

10. The computer-readable storage medium of claim 7, wherein the secure session is a HTTPS session.

11. The computer-readable storage medium of claim 7, wherein the encrypted data is transmitted from the server towards the client application and wherein intercepting the encrypted data comprises obtaining the encrypted data from the server.

12. The computer-readable storage medium of claim 7, wherein the operation further comprises:
associating the session ID with the symmetric key.

13. A system comprising:
a processor; and
a memory storing code, which, when executed on the processor, performs an operation comprising:
accessing, via a traffic-monitoring tool executing at a client, an application library of an application executing at the client, wherein the traffic-monitoring tool includes an application programming interface (API) hook for hooking the traffic-monitoring tool to the application library that establishes a secure session for the client;

detecting, via the traffic-monitoring tool executing at the client, the secure session being established between a server and the application executing at the client;

obtaining, via the traffic-monitoring tool executing at the client, a symmetric key generated by the application upon detection of the secure session and a session ID of the secure session to map the symmetric key to the secure session;

intercepting, via the traffic-monitoring tool executing at the client, encrypted data transmitted between the client application and the server as part of the secure session;

in response to the interception, suspending, via the traffic-monitoring tool executing at the client, further transmission of further encrypted data between the client application and the server;

based on the suspension, generating a copy of the encrypted data, via the traffic-monitoring tool executing at the client, wherein the generated copy of the encrypted data is stored at the client;

decrypting the copy of the encrypted data stored at the client via the traffic-monitoring tool executing at the client using the symmetric key and the session ID;

determining via the traffic-monitoring tool executing at the client that the decrypted data indicates a potential threat to the client; and based on the determination, blocking transmission of the encrypted data to the client application.

14. The system of claim 13, wherein the operation further comprises:
upon determining that the decrypted data does not include one or more risks to the client, allowing the transmission of the encrypted data.

15. The system of claim 13, wherein the secure session is a HTTPS session.

16. The system of claim 13, wherein the encrypted data is transmitted from the server towards the client application and wherein intercepting the encrypted data comprises obtaining the encrypted data from the server.

17. The system of claim 13, wherein the operation further comprises:
associating the session ID with the symmetric key.

* * * * *